(12) United States Patent
Kennedy et al.

(10) Patent No.: US 10,294,916 B2
(45) Date of Patent: May 21, 2019

(54) FLUID FLOW INDUCED OSCILLATING ENERGY HARVESTER MAXIMIZING POWER OUTPUT THROUGH OFF-CENTER MOUNTED TOGGLING BLUFF BODY AND/OR SUSPENSION STIFFENING MECHANISM

(71) Applicant: Renerge, Inc, Pittsburgh, PA (US)

(72) Inventors: Scott Kennedy, Durham, NC (US); Lisa Weiland, Pittsburgh, PA (US)

(73) Assignee: RENERGE, INC., Pittsburgh, PA (US)

( * ) Notice: Subject to any disclaimer, the term of this patent is extended or adjusted under 35 U.S.C. 154(b) by 166 days.

(21) Appl. No.: 15/353,120

(22) Filed: Nov. 16, 2016

(65) Prior Publication Data

US 2017/0234294 A1 Aug. 17, 2017

Related U.S. Application Data

(63) Continuation of application No. PCT/US2015/031352, filed on May 18, 2015.
(Continued)

(51) Int. Cl.
*F03B 17/06* (2006.01)
*F03B 13/10* (2006.01)
*H02K 35/02* (2006.01)

(52) U.S. Cl.
CPC .............. *F03B 17/06* (2013.01); *F03B 13/10* (2013.01); *H02K 35/02* (2013.01);
(Continued)

(58) Field of Classification Search
CPC .......... F03B 17/06; F03B 13/10; H02K 35/02
See application file for complete search history.

(56) References Cited

U.S. PATENT DOCUMENTS

| 2,341,679 | A | 2/1944 | Wildermuth |
| 4,024,409 | A | 5/1977 | Payne |

(Continued)

FOREIGN PATENT DOCUMENTS

| DE | 102008063340 | 7/2010 |
| RU | 02341679 | 12/2008 |

(Continued)

*Primary Examiner* — Pedro J Cuevas
*Assistant Examiner* — Thomas K Quigley
(74) *Attorney, Agent, or Firm* — Blynn L. Shideler; Krisanne Shideler; BLK Law Group

(57) ABSTRACT

A fluid flow induced oscillating energy harvester includes a stand supporting the harvester in a fluid flow; a support member mounted for movement relative to the stand in a direction perpendicular to the flow direction; a bluff body positioned substantially perpendicular to the flow direction and pivotally mounted to the support member at a position off-center from the center of mass of the bluff body, wherein sufficient fluid flow causes an oscillating movement of the bluff body and the support member relative to the stand; and an electrical generator coupled to the support member and configured to convert oscillating movement of the support member to electrical power. The harvester may include a support member spring supporting the support member for oscillation about a support member rest position wherein the support member spring exhibits a higher stiffness at higher oscillation amplitudes of the bluff body and the support member.

16 Claims, 7 Drawing Sheets

Related U.S. Application Data

(60) Provisional application No. 61/994,203, filed on May 16, 2014.

(52) U.S. Cl.
CPC ...... *F05B 2220/707* (2013.01); *F05B 2240/97* (2013.01); *F05B 2260/4031* (2013.01); *Y02E 10/22* (2013.01); *Y02E 10/28* (2013.01)

(56) References Cited

U.S. PATENT DOCUMENTS

| | | | |
|---|---|---|---|
| 4,184,805 A | 1/1980 | Arnold | |
| 4,347,036 A | 8/1982 | Arnold | |
| 4,476,397 A | 10/1984 | Lawson | |
| 5,324,169 A | 6/1994 | Brown et al. | |
| 5,548,956 A | 8/1996 | Price | |
| 6,153,944 A | 11/2000 | Clark | |
| 7,224,077 B2 * | 5/2007 | Allen | F03D 5/00 290/1 R |
| 7,493,759 B2 | 2/2009 | Bernitsas et al. | |
| 7,573,143 B2 | 8/2009 | Frayne | |
| 7,633,175 B1 | 12/2009 | Wilson, III et al. | |
| 7,696,634 B2 | 4/2010 | Filardo | |
| 7,821,144 B2 | 10/2010 | Frayne | |
| 7,839,007 B2 | 11/2010 | Filardo | |
| 7,863,768 B2 | 1/2011 | Filardo | |
| 7,874,882 B2 | 1/2011 | Sagov | |
| 7,884,490 B1 | 2/2011 | Wilson, III et al. | |
| 7,986,054 B2 | 7/2011 | Douglas | |
| 7,989,973 B2 | 8/2011 | Birkestrand | |
| 8,026,619 B2 | 9/2011 | Frayne | |
| 8,047,232 B2 | 11/2011 | Bernitsas et al. | |
| 8,142,154 B2 | 3/2012 | Gartner | |
| 8,288,883 B2 | 10/2012 | Finnigan | |
| 8,432,057 B2 | 4/2013 | Filardo | |
| 8,534,057 B1 | 9/2013 | Brown | |
| 8,604,634 B2 | 12/2013 | Pabon et al. | |
| 8,610,304 B2 | 12/2013 | Filardo | |
| 8,648,480 B1 | 2/2014 | Liu et al. | |
| 8,928,167 B2 * | 1/2015 | Kane | H02K 7/1892 290/43 |
| 2007/0176430 A1 | 8/2007 | Hammig | |
| 2008/0048455 A1 * | 2/2008 | Carney | F03D 5/00 290/54 |
| 2009/0121489 A1 | 5/2009 | Kawai | |
| 2013/0200628 A1 * | 8/2013 | Kane | F03B 17/062 290/54 |

FOREIGN PATENT DOCUMENTS

| | | |
|---|---|---|
| WO | WO1981001867 | 7/1981 |
| WO | WO2006055583 | 5/2006 |
| WO | WO2008144938 | 12/2008 |
| WO | WO2011090453 | 7/2011 |
| WO | WO2015176057 | 11/2015 |

* cited by examiner

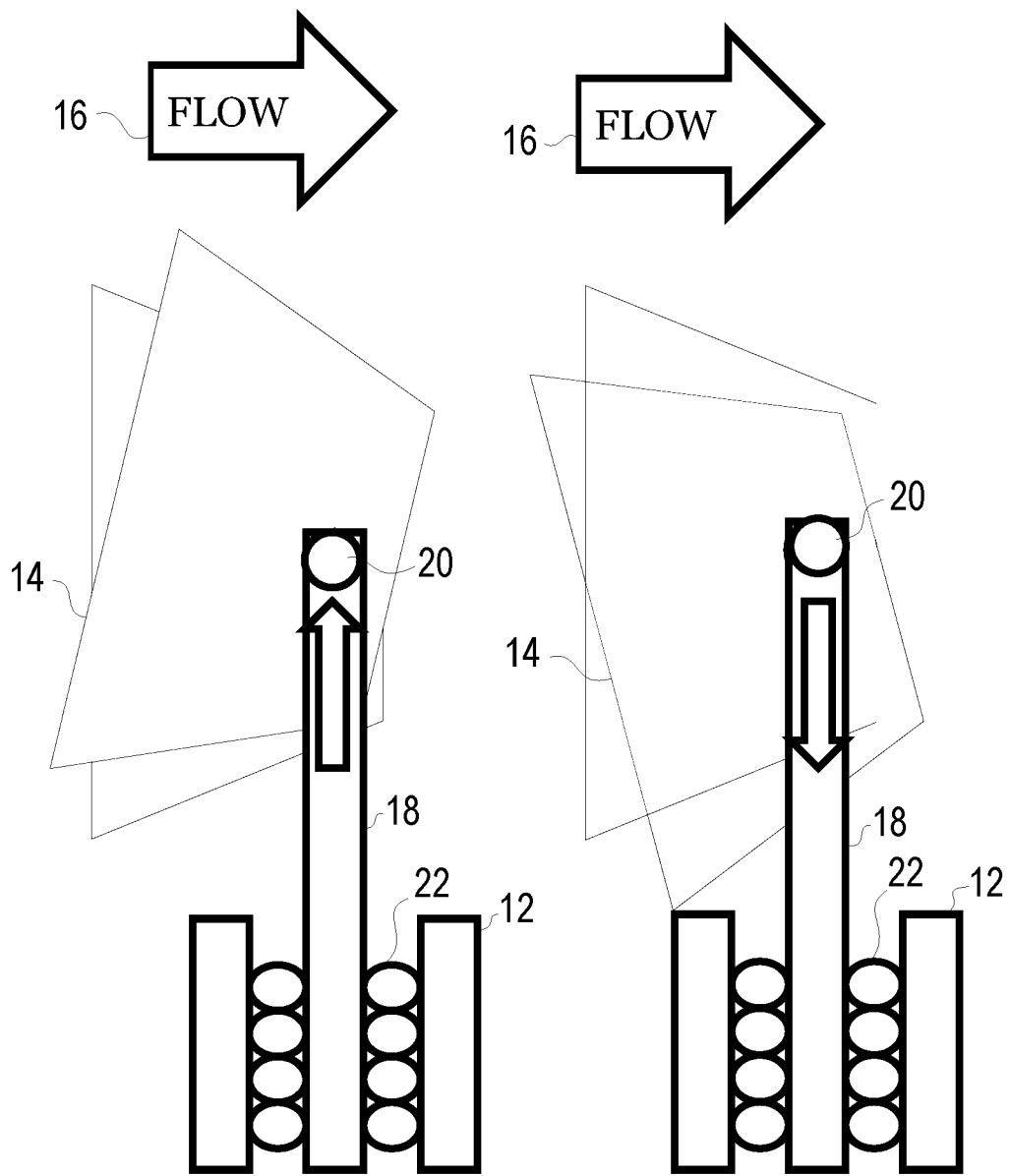

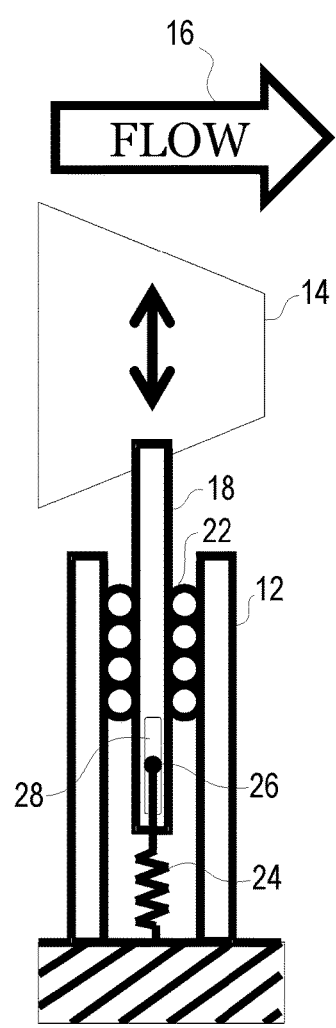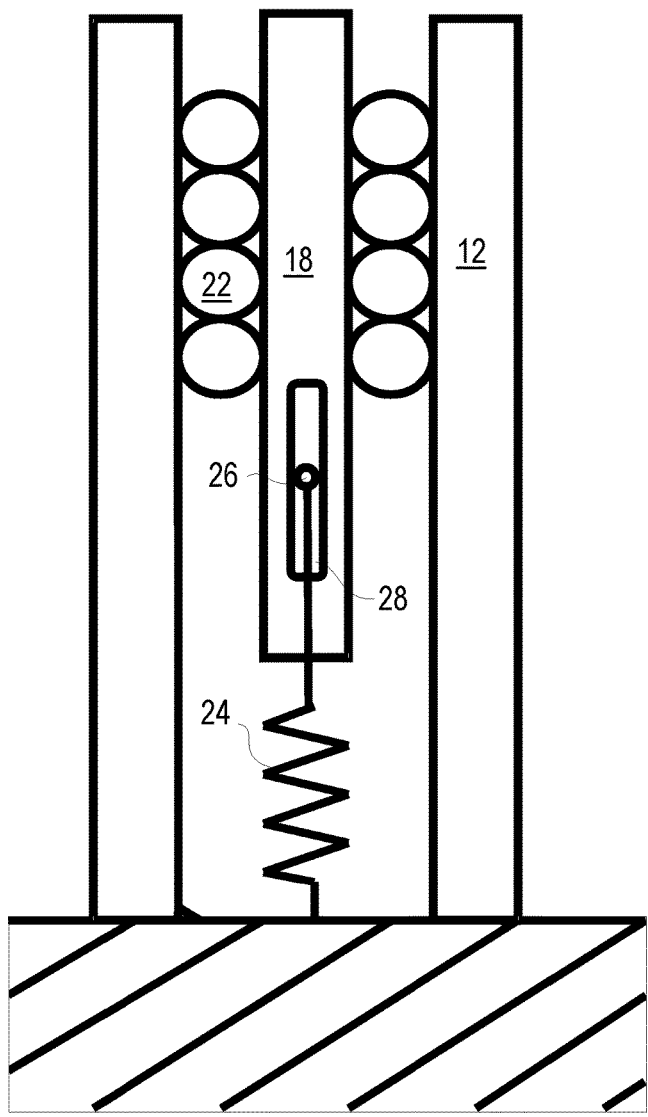
FIG. 4A
FIG. 4B

FLUID FLOW INDUCED OSCILLATING ENERGY HARVESTER MAXIMIZING POWER OUTPUT THROUGH OFF-CENTER MOUNTED TOGGLING BLUFF BODY AND/OR SUSPENSION STIFFENING MECHANISM

RELATED APPLICATIONS

This application is a continuation of International Patent Application serial number PCT/US2015/031352 entitled "Fluid Flow Induced Oscillating Energy Harvester with Off-Center Mounted Toggling Bluff Body and/or Suspension Stiffening Mechanism" and which published Nov. 19, 2015 as WO2015-176,059, which publication is incorporated herein by reference. International Patent Application serial number PCT/US2015/031352 claims priority to U.S. Patent Application Ser. No. 61/994,203 filed May 16, 2014, entitled "Fluid Flow Induced Oscillating Energy Harvester with Off-Center Mounted Toggling Bluff Body and/or Suspension Stiffening Mechanism" which application is incorporated herein by reference in its entirety.

BACKGROUND INFORMATION

1. Field of the invention

The present invention relates to fluid flow induced oscillating energy harvesters, particularly to maximizing power output in fluid flow induced oscillating energy harvesters.

2. Background Information

Energy harvesters converting ambient energy into electrical energy have attracted much interest in both the military and commercial sectors. For example, some energy harvesters convert motion of ocean waves into electricity to be used by oceanographic monitoring sensors for autonomous operation. Applications may include high power output devices (or arrays of such devices) deployed at remote locations to serve as reliable power stations. These energy harvesters generally must be sufficiently robust to endure long-term exposure to hostile environments and it is preferable if they have a broad range of dynamic sensitivity to exploit the entire spectrum of wave motions.

Energy harvesters in the form of conventional hydroelectric power generators usually comprise large rotating water turbines requiring extensive civil engineering works, and which require a large pressure head to be effective. This, in turn, historically demanded a high dam for creating the necessary potential energy. These large conventional hydroelectric power generators are not suitable for operating in the shallow waters found in most rivers and tidal flows. As a result, hydroelectric water projects that utilize the entire river flow tend to be quite large thereby consuming large amounts of real estate and capital. The large capital requirements are in addition to the detrimental effects of displacing whole populations of people with wholesale disruption of the local environment and the natural migration of fish.

There are many locations where a large mass of relatively shallow water flows in a constant and reliable manner under a relatively low pressure head, generally in areas of relatively flat terrain, which may not be suitable for efficiently driving a conventional water turbine. Often these locations are conveniently near large inland and some coastal cities, which are the major consumers of electric power. These locations include the fresh water currents in various rivers and streams throughout the world such as, for example, the Mississippi and Amazon Rivers, as well ocean currents such as Gulf Stream and the tidal currents in places like the Bay of Fundy.

Thus, there is a need for a fluid responsive energy harvester which can economically and safely extract useful power from relatively low head shallow waters and to use that power to perform useful work, such as the generation of electricity, nearer the point of consumption, thereby saving the environmentally degradation as well as the capitol expense and losses of power transmission systems.

PRIOR ART REVIEW

The prior art has disclosed a number of fluid responsive energy harvesting methods, both theoretical and practical, for similar applications such as disclosed in U.S. Pat. No. 8,648,480. The '480 patent discloses an energy harvester configured to harness flow energy in a submerged platform having a support member located external to the housing and directly exposed to the fluid flow and lengthwise positioned in the direction of the fluid flow. The system provides for arraying a plurality of narrow diameter cantilevered cylinders to facilitate high frequency oscillations and tip displacements to drive the energy harvesters.

U.S. Pat. No. 8,610,304, and related U.S. Pat. Nos. 8,432,057 and 7,863,768 and 7,839,007 and 7,696,634, all disclose mechanisms for creating undulating motion, such as for propulsion, and for harnessing the energy of moving fluid. The mechanisms receive and transfer forces via transducers having one or more persistent deformations in changeable locations. Actuator or propulsion embodiments are powered by elastic or variable length transducers that exert forces on the deformed members which in turn exert forces onto ambient fluid such as air or water.

U.S. Pat. No. 8,604,634 discloses an energy harvester operating from flow-induced vibrations in which electrical energy is produced at a remote site by converting kinetic energy from fluid flow to electrical energy using a downhole energy harvester, also called a borehole energy harvester.

U.S. Pat. No. 8,534,057 discloses an energy harvester for a waterway with a plurality of blades fixed between wheels or linkages, wherein each blade "stabs" orthogonally into and out of the flow of water edge first, minimizing the displacement and disruption of the water upon entering.

U.S. Pat. No. 8,288,883 discloses an energy harvester for capturing energy from a fluid flow including a base and an oscillating member in the fluid flow pivotally connected relative to the base about a substantially vertical first pivotal axis.

U.S. Pat. No. 8,142,154 discloses an oscillating energy harvester in which two or more pivots are mounted onto a platform, and between these pivots, a flexible sheet of material is suspended in the fluid flow. The mechanism operates via oscillation of the pivots that result from the upwind or upstream pivot determining the side of the flexible sheet the low-pressure (lift) area favors.

U.S. Pat. No. 8,047,232 discloses an energy harvester designed to enhance vortex induced forces and motion through surface roughness control, whereby roughness is added to the surface of a bluff body in a relative motion with respect to a fluid.

U.S. Pat. No. 8,026,619, and related U.S. Pat. Nos. 7,821,144, and 7,573,143, all disclose an energy harvester utilizing fluid-induced oscillations in which the harvester includes a flexible membrane in the fluid flow having at least two fixed ends.

U.S. Pat. No. 7,989,973 discloses an energy harvester including a wing-shaped blade in the fluid flow in which a lift differential producing device in the blade produces a lift differential at the opposite sides of the blade and that device is switched so that one blade side or the other produces the greater lift for generating an oscillation in the moving blade.

U.S. Pat. No. 7,986,054 discloses an energy harvester capable of providing motion from fluid flow includes a magnus-rotor defined by a cylinder driven by a motor causing the cylinder to rotate so that lift is created by the fluid flowing past the cylinder.

U.S. Pat. Nos. 7,884,490 and 7,633,175 disclose an energy harvester with a resonating blade exposed to a fluid flow.

U.S. Pat. No. 7,874,882 is believed to be an equivalent of US 2009-0023349 and EP1814789 and discloses an energy harvester that comprises at least one flap member having a rear flap portion that runs in a plate plane, and a forward portion, as seen in the direction of motion. The forward portion is connected to the object in such manner that the flap portion can be moved in the fluid transverse to the plate plane and between two positions which are on their respective sides of a neutral place. Furthermore, the device comprises an actuating means which allows a freely oscillating motion of the flap member and a drive unit for actuating the flap member when the valve of an oscillation amplitude of the flap member is less than a predetermined threshold value.

U.S. Pat. No. 7,493,759 discloses an energy harvester including at least one movable element immersed in a fluid medium and supported externally on a support structure such that the movable element can move relatively to the structure in response to a fluid motion by vortex induced motion, galloping or combination thereof, and at least one power device supported on the support structure and coupled to the movable element.

U.S. Pat. No. 6,153,944 discloses a fluid flow based energy harvester generating electricity from Aeolian oscillations caused by the flow of a fluid. An immobile beam extends between two piers, and a movable vane is disposed around the beam in parallel relation thereto.

U.S. Pat. No. 5,548,956 discloses an energy harvester having cable restrained reciprocating blades for energy extraction from moving body of water U.S. Pat. No. 5,324,169 discloses an oscillating, "lateral thrust" energy harvester for power production from low velocity fluid flow which includes a lateral support arm assembly extending from a vertical drive shaft. A power blade is pivotally secured to the distal end of the support arm, and constrained to pivot within a defined operating angle.

U.S. Pat. No. 4,476,397 discloses an energy harvester utilizing a sail and a mast pivotably mounted to a support configured to provide power from a relatively large volume of fluid moving at a relatively low speed.

U.S. Pat. Nos. 4,347,036 and 4,184,805 disclose an energy harvester implementing a "cascade" of thin airfoils. In one embodiment, the airfoils are provided with at least two degrees of freedom and adjacent airfoils are movable out of phase. The airfoils are subjected to the aerodynamically induced oscillations caused by the aero-elastic phenomenon known as flutter and the oscillatory movement is then harnessed to do useful work. In an alternate embodiment, the cascade of airfoils is mechanically oscillated within a moving fluid stream to increase the propulsion of the fluid. Where the fluid is a liquid, the cascade includes a plurality of hydrofoils.

U.S. Pat. No. 4,024,409 discloses an energy harvester which utilizes a member which oscillates in response to movement of a fluid past it and a means for utilizing the energy generated by the oscillation. In one embodiment the oscillating member is a cable utilizing wind or water as generator or pump. In a second embodiment, the oscillating member is an airfoil having either pitch control or active circulation control.

U.S. Patent Application Publication Number 2007-0176430 discloses a fluid powered energy harvester with an oscillating member in which the magnitude of the oscillations is controlled "by the degree of mechanical resonance between the oscillation rate of the fluidic thrusting and the structures resonance frequency."

U.S. Patent Application Publication Number 2009-0121489 discloses a fluid powered "flag type" energy harvester with a flexible pane oscillating member.

Russian publication 02341679 discloses a fluid powered energy harvester that comprises a submerged hydrodynamic wing profile rotatably mounted on an axle and interacting with the flow of the flowing medium. A mechanism for changing the position of the blade is designed as a symmetrically arranged on the longitudinal side of the chassis which stops rotation of the blades. A hydraulic force converter is kinematically connected to the supporting element. The design provides an alleged increase in engine efficiency and simplification of its construction.

The parent application published as WO2015-176,059, which publication is incorporated herein by reference, and The searching authority indicated that additionally WO2011/090,453 from 2011; German Patent "102008063340" and WO2008/144,938 from 2008 were documents defining the general state of the art, although not considered of particular relevance to the current claims.

The above identified patents and published patent applications, which are incorporated herein by reference, are a representative sample of fluid responsive energy harvesting including fluid flow induced oscillating energy harvesters. There is a need to simply and efficiently maximize energy harvesting in fluid flow induced oscillating energy harvesters. It is an object of the present invention to address this deficiency in the prior art fluid flow induced oscillating energy harvesters.

SUMMARY OF THE INVENTION

This invention is directed to cost effective, efficient, fluid flow induced oscillating energy harvesters that overcome at least some of the drawbacks of the existing designs and which provide a cost effective, efficient approach to maximizing power output in fluid flow induced oscillating energy harvesters.

One aspect of the present invention provides a fluid flow induced oscillating energy harvester including a stand supporting the energy harvester and configured to support the energy harvester in a fluid flow; a support member mounted for movement relative to the stand in a direction perpendicular to the direction of fluid flow; a bluff body configured to be positioned substantially perpendicular to the direction of fluid flow and pivotally mounted to the support member, wherein sufficient fluid flow causes an oscillating movement of the bluff body and the support member relative to the stand, and wherein the bluff body pivotally mounted to the support member at a position off-center from the center of mass of the bluff body; and an electrical generator coupled to the stand and to the support member, wherein the electrical generator is configured to convert oscillating movement of the bluff body and the support member to electrical power.

One embodiment of the invention provides a fluid flow induced oscillating energy harvester including a stand supporting the energy harvester and configured to support the energy harvester in a fluid flow; a support member mounted for movement relative to the stand in a direction perpendicular to the direction of fluid flow; a bluff body configured to be positioned substantially perpendicular to the direction of fluid flow, wherein sufficient fluid flow causes an oscillating movement of the bluff body and the support member relative to the stand; an electrical generator coupled to the stand and to the support member, wherein the electrical generator is configured to convert oscillating movement of the bluff body and the support member to electrical power; and a support member spring supporting the support member for oscillation about a support member rest position, wherein the support member spring exhibits a higher stiffness at higher oscillation amplitudes of the bluff body and the support member.

These and other aspects of the present invention will be clarified in the description of the preferred embodiment of the present invention described below in connection with the attached figures in which like reference numerals represent like elements throughout.

BRIEF DESCRIPTION OF THE DRAWINGS

FIGS. 2A and B are schematic views of a fluid flow induced oscillating energy harvester with off-center mounted toggling bluff body according to one embodiment of the present invention;

FIG. 4A is a schematic view of a fluid flow induced oscillating energy harvester with a suspension stiffening mechanism according to one embodiment of the present invention;

FIG. 4B is an enlarged schematic view of the fluid flow induced oscillating energy harvester of FIG. 4A;

BRIEF DESCRIPTION OF THE PREFERRED EMBODIMENTS

This invention is directed to a cost effective, efficient, fluid flow induced oscillating energy harvester 10 that maximizes power output and overcomes at least some of the drawbacks of the existing proposed designs. The up and down orientations in the figures is arbitrary. The harvester 10 may be supported in a fluid flow 16 extending vertically upwards generally as viewed in the figures or may be supported downward in the flow 16, such as being suspended from a barge or deck structure on the surface of a river.

Figure 1:
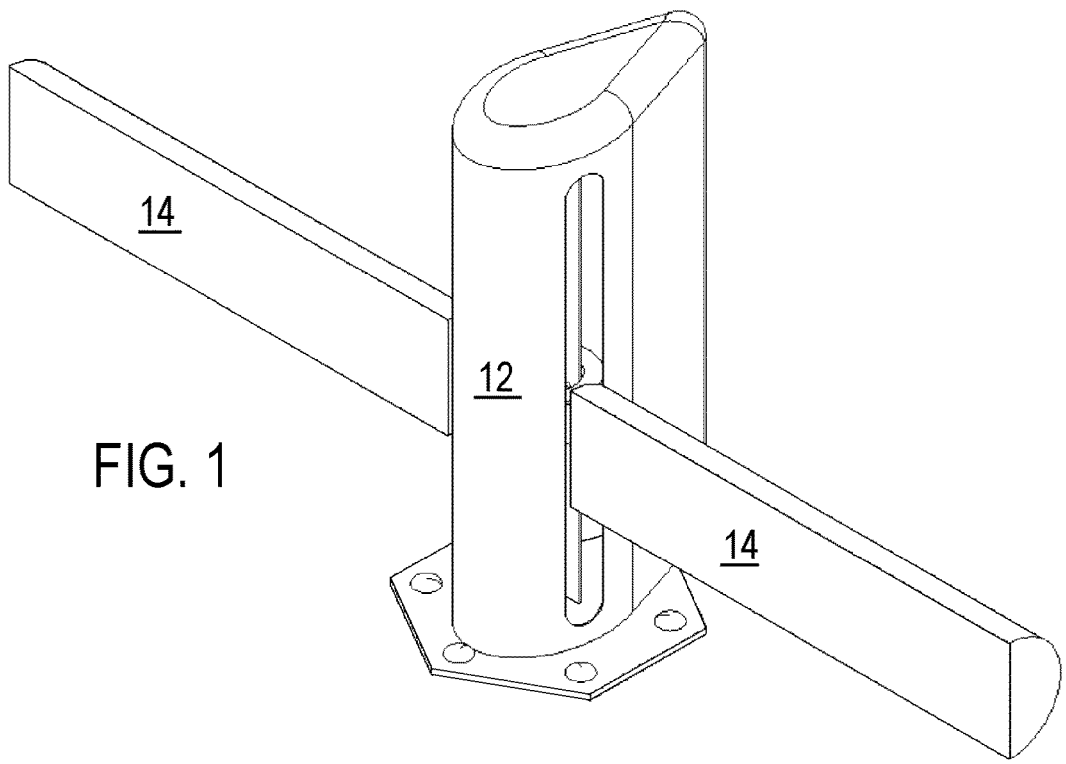
FIG. 1 is a schematic view of a fluid flow induced oscillating energy harvester according to the present invention.

One embodiment of the energy harvester 10 of the present invention is shown in FIGS. 1 and 2A and B and 3A and B. The currently proposed oscillating energy harvester 10 includes a stand 12 supporting the oscillating energy harvester 10 in a fluid stream or current, such as on a river bed or suspended into the river. The stand 12 may also be called a base, housing, support and/or piling. The construction of the stand 12, such as the shape shown in FIG. 1, is generally known in the art and need not be described in detail herein.

The stand 12 supports at least one, and generally a plurality of spaced bluff bodies 14. A pair of cantilevered bluff bodies 14 is shown in FIG. 1 extending from the stand 12, but other number of bodies 14 could be utilized. Further FIG. 1 shows a pair of bodies 14 extending from the side of the stand 12, which may be more common arrangement while FIGS. 2A-B, 3A-B and 4A and B suggest a placement of the bodies 14 above the stand 12 mainly to simplify the schematic illustration of the components of the harvester 10. Both arrangements are possible, as is suspending the bodies 14 below the stand 12 where the stand 12 is mounted above the primary flow to a floating platform or deck, such as a barge (and which surface location may represent a simpler easier location for the electrical generator and associated elements).

Each bluff body 14 may also be referenced as a prism or a beam. In the preferred embodiment each bluff body 14 is extending from the stand 12 in a cantilevered fashion as shown in FIG. 1. Alternatively, each bluff body 14 may be supported between a pair of stands 12 at opposed ends thereof, however the cantilevered arrangement shown in FIG. 1 is believed to be more economical and more efficient. Each bluff body 14 is configured to be positioned substantially perpendicular to the direction of fluid flow (shown at 16). The particular construction of the bluff bodies 14 is believed to be known to those of ordinary skill in the art and the shape and surface of the bluff body 14 may be optimized for maximizing oscillation.

In the harvester 10, each bluff body 14 is mounted for movement relative to the stand 12 at least in a direction perpendicular to the direction of fluid flow 16. As shown each bluff body 14 is coupled to a support member 18 which extends into the stand 12 to an electrical generator coupled to the stand. The electrical generator may be generally within the stand 12, or in a configuration in which the harvester 10 is suspended from a platform above the flow 16 it may be easier and more efficient to locate the electrical generator on the platform above the stand 12.

The support member 18 may take a number of forms and can include several elements, but can be generally described as the coupling between the moveable elements of the electrical generator and the oscillating bluff bodies 14. The schematic FIGS. 2A and B, 3A and B and 4A and B form a representational image of the function of the support member 18. The electrical generator may be moving a magnet coupled to the support member 18 through coils or a rotational generator as known in the art.

The electrical generator may be mounted within the stand 12, particularly for sub-fluid positioning, but may be located anywhere where it can obtain the necessary mechanical movement of the support member 18 and convert this to electrical energy. The construction of the electrical generator, per se, is known to those of ordinary skill in the art.

Conventional bearing, packing and sealing structures 22 can maintain and restrict the movement of the support member 18 and associated bluff body 14 to a constrained oscillation motion. The details of constructing the support member 18 and the bearing, packing and sealing structures 22 are generally known in the art. The form of the sealing structures 22 is dictated by the particulars of the support member 18.

Oscillation of the bluff body 14 is driven by fluid flow 16 past the bluff body 14, wherein sufficient fluid flow 16 causes an oscillating movement of the bluff body 14 and support member 18 relative to the stand 12 and provides mechanical movement to the electrical generator thus providing a fluid flow induced oscillating energy harvester 10.

A key feature of the present invention is that the bluff body 14 is pivotally mounted to the support member 18 via pivot member 20. Specifically, the fluid flow induced oscillating energy harvester 10 according to the invention provides that the bluff body 14 is pivotally mounted via pivot 20 to the support member 18 at a position off-center from the center of mass of the bluff body 14 as shown. The bluff body 14 is pivotally mounted to the support member 18 at a position down-stream from the center of mass of the bluff body 18 relative to the direction of fluid flow 16 as shown.

The fluid flow induced oscillating energy harvester 10 will have in one embodiment of the invention each bluff body 14 pivotally mounted to the support member for rotation through about a 40 degree range of motion. A torsional spring (not shown) may be mounted between the support member 18 and the bluff body 14 about the pivot 20 and configured to bias the bluff body 14 to a neutral bluff body rest position (i.e. the torsion spring provides a restoring force). Thus the bluff body 14 may be pivotally mounted to the support member 18 for rotation through about a +/−20 degree range of motion relative to the bluff body 14's rest position. Other restoring force members may be utilized such as elastic members coupled to the bluff body 14 or around the pivot 20.

The toggling bluff body 14 concept provides the mounting the bluff body 14 so that it can oscillate about the point of pivot member 20 downstream of the center of mass of the bluff body 14. Testing has shown that the torsion spring is helpful to provide a restoring force to the bluff body rotation and improvements to oscillation robustness have been observed with toggle ranges of about ±20°. This toggling body 14 design provides higher harvesting (higher energy yields).

Figure 3A:
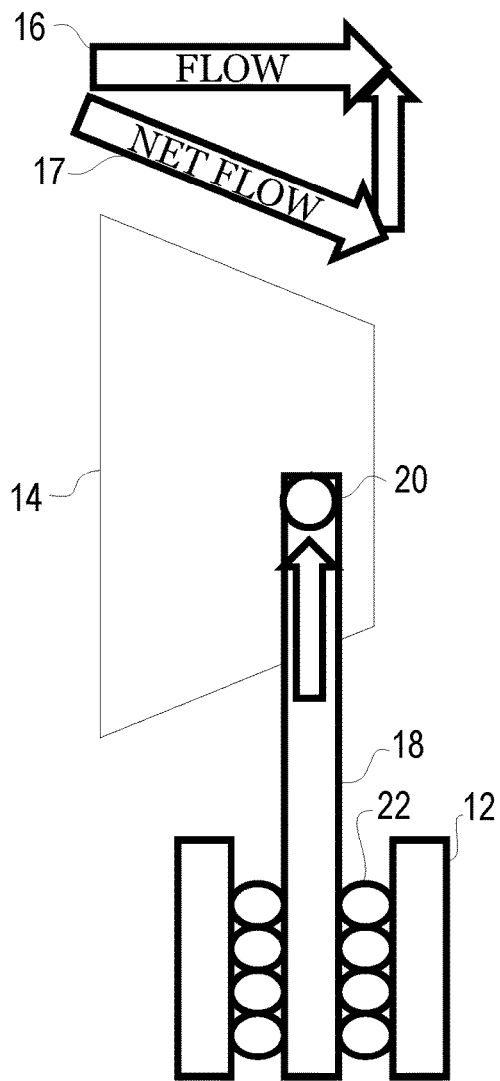
FIGS. 3A and B are schematic views of the fluid flow induced oscillating energy harvester of FIGS. 2A and B.
Figure 3B:
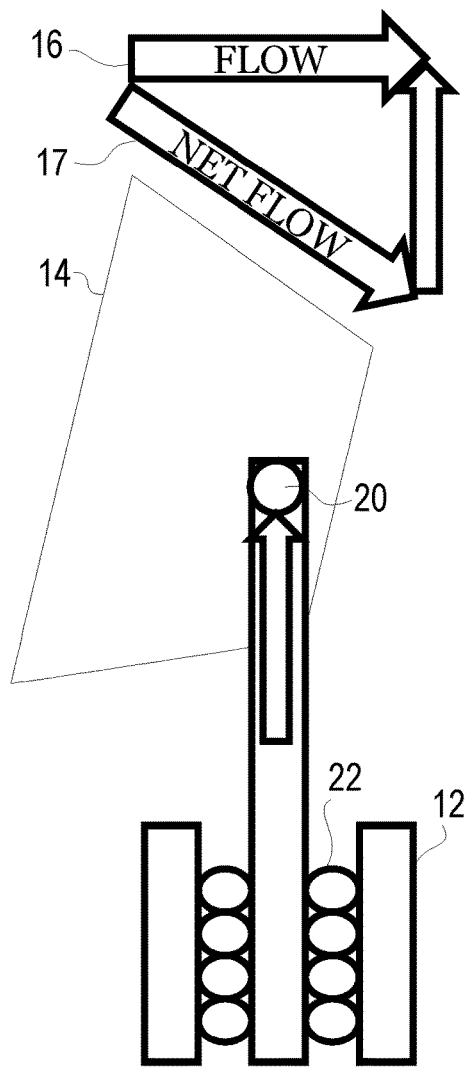

One way to understand the effect is illustrated in FIGS. 3A and B which illustrate that the fluid loading is a function of the net flow direction 17 of fluid over the surface of the bluff body 14. The net flow direction 17 depends on the flow velocity 16 and the velocity of the bluff body 14 perpendicular to the flow 16. The attack angle of the flow oscillates as the bluff body 14 oscillates. If, for example, the peak driving force of the shape illustrated in the figures for the body 14 was maximum when the net flow 17 was parallel to the top surface of the trapezoidal bluff body 14, then the peak driving force would occur when the oscillator reaches a higher velocity in the case of the toggling bluff body 14.

Figures 5, 6A:
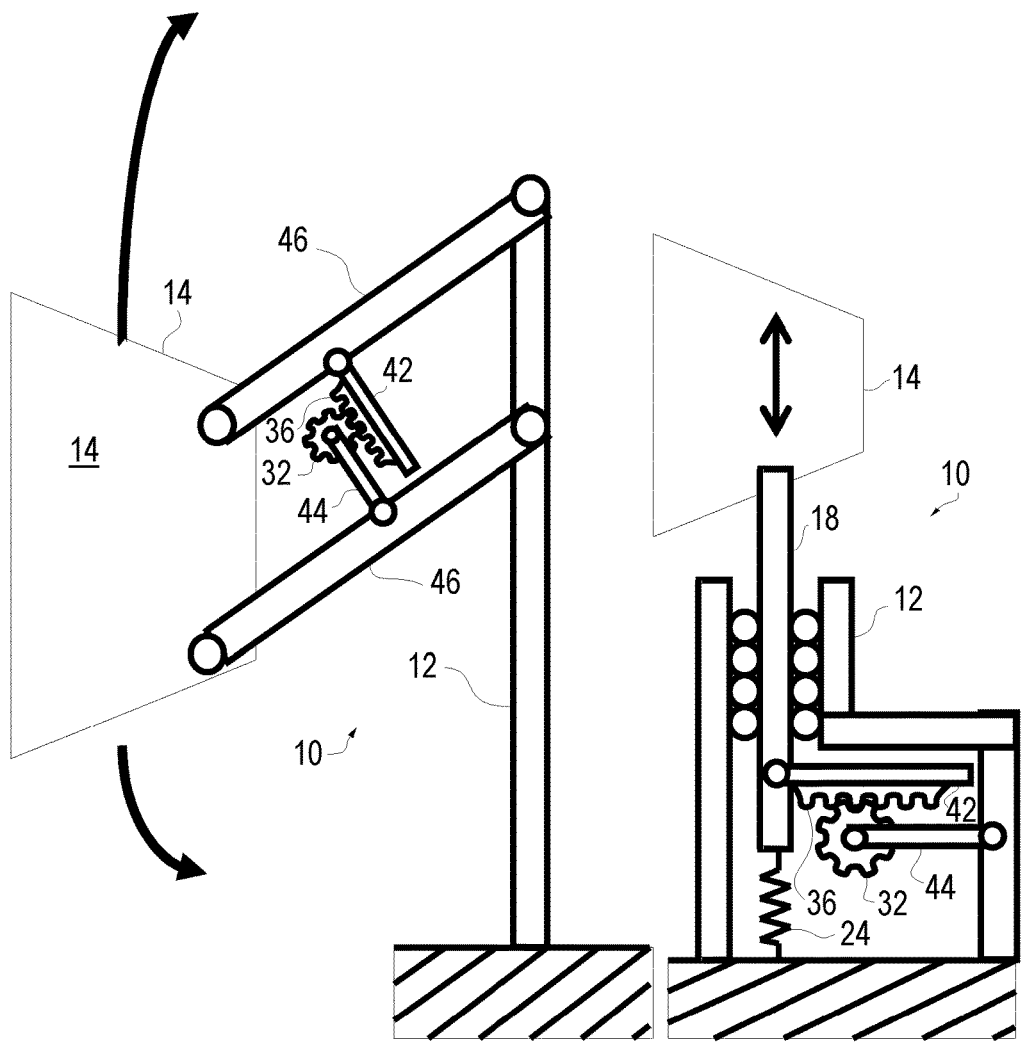
FIG. 5 is a schematic view of a fluid flow induced oscillating energy harvester according to another embodiment of the present invention.
FIGS. 6A-C are schematic views of alternative linkage arrangements of the fluid flow induced oscillating energy harvester according to further embodiments of the present invention.
Figure 6B:
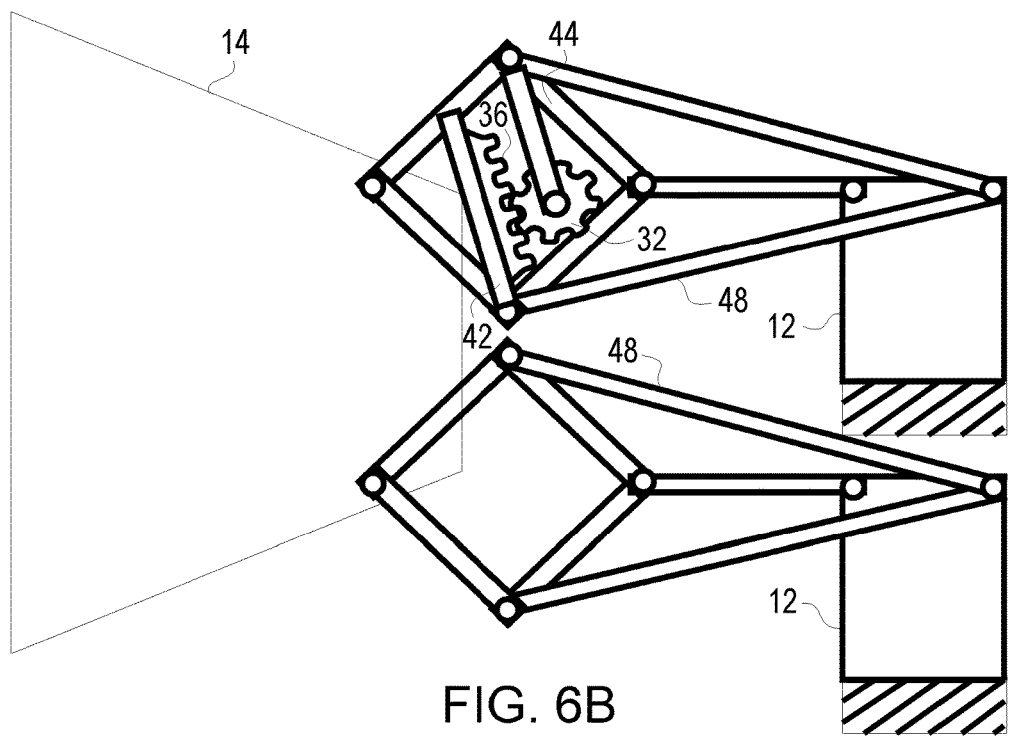
Figure 6C:
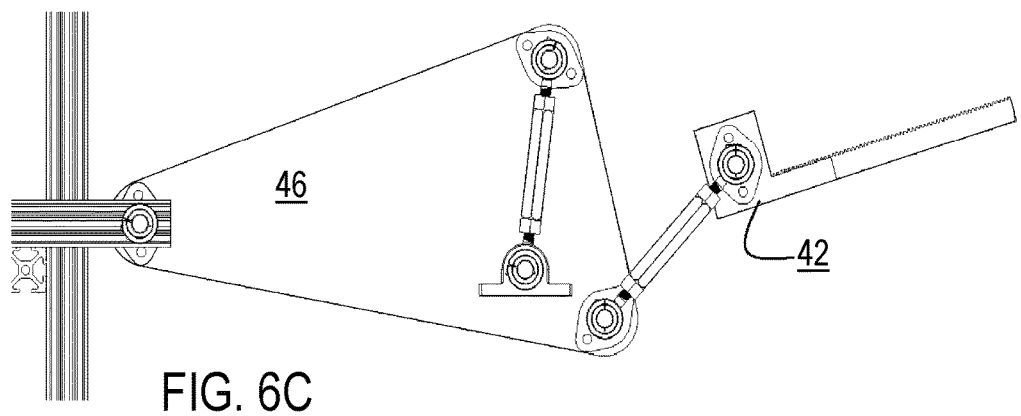

The oscillating support member 18 and bluff body 14 is suspended or supported by a support member spring 24 shown in FIGS. 4A and 4B. The support member spring 24 establishes a zero-displacement or rest position for the support member 18. If there is no flow, the structure formed of support member 18 portion of the electrical generator coupled thereto and body 14 will rest at this position and when there is sufficient flow, the structure will oscillate about this rest position. FIG. 4A and B do not illustrate the toggling prism or body 14 of FIGS. 2A-3B merely to illustrate that the features of the suspension stiffening mechanism of FIGS. 4A and 4B may be used independent of the toggling bodies 14 and vice versa. An important feature of this embodiment shown in FIGS. 4A and B is that the support member spring 24 exhibits a higher stiffness at higher oscillation amplitudes of the bluff body 14 and the support member 18. Further the support member spring 24 may be configured, as shown, to exhibits no force on the support member 18 for a range of motion about the support member rest position. Specifically the spring 24 is coupled to the support member 18 through a pin 26 within a slider 28 such that spring 24 effectively disengages near the neutral or zero displacement point. An alternative to this design is to have a single spring engaged at lower amplitudes and added springs become engaged at higher amplitudes. In a further alternative, a single spring design could also be implemented that exhibits higher stiffness at higher amplitudes It is apparent that many variations to the present invention may be made without departing from the spirit and scope of the invention. For example, FIG. 5 is a schematic view of a oscillating energy harvester 10 according to another embodiment of the present invention in which a rack 36 is mounted to a linkage 42 coupled to the support 18 and meshes with a pinion 32 driving a rotary generator (the electrical generator) with the pinion 32 mounted on a separate linkage 44 coupled to the stand 12. The compound motion of the support 18 and the linkages 42 and 44 provides for an improved harvesting rate. Specifically as the amplitude of the motion of the body 14, increases the motion of the rack 36 relative to the pinion 32 increases thereby increasing the rotation rate of the pinion 32. Similarly, FIGS. 6A and B are schematic views of a proposed linkage assemblies for the fluid flow induced oscillating energy harvester 10 according to further embodiments of the present invention. In FIG. 6A the support 18 is replaced with a four bar linkage 46 and the electrical generator, here in the form of a rotary generator, is moved outside of the stand 12 to a position between the four bar linkage 46 as shown using the linkages 42 and 44 similar to FIG. 5. Analogous to FIG. 5 the compound motion of the four bar linkage 46 and the linkages 42 and 44 provides for increased harvesting yield. Specifically, as the amplitude of the motion of the body 14 increases the motion of the rack 36 relative to the pinion 32 increases thus increasing the rotation rate of the pinion 32. The spring 24 can be replaced with torsional springs to maintain the rest position of the body 14. FIG. 6B is analogous to the embodiment of FIG. 6A except the four bar linkage 46 is replaced with a Peaucellier-Lipkin linkage 48, wherein the compound motion of the Peaucellier-Lipkin linkage 48 provides for an increased harvesting rate. Specifically as the amplitude of the motion of the body 14 increases the motion of the rack 36 relative to the pinion 32 increases thus increasing the rotation of the pinion 32. FIG. 6C shows an alternative harvester 10 linkage arrangements (with the generator removed for clarity) that may be more applicable for a suspended harvester 10 described herein and is merely illustrating further linkage possibilities.

Figure 7:
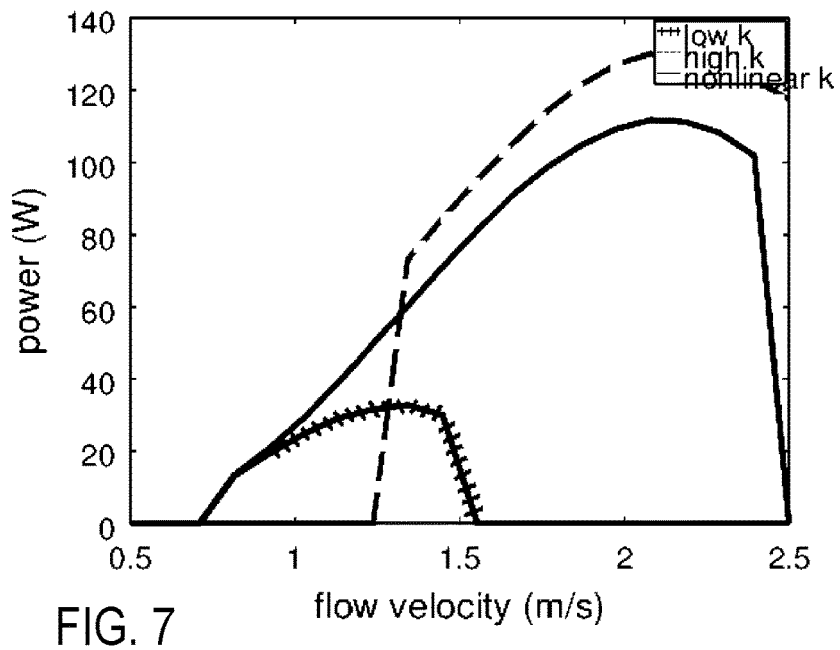
FIG. 7 is a plot of experimental results of power outputs over a range of flows of a system of the present invention using low high and variable stiffness according to the present invention.

Further there can be many other methods and spring designs for providing a nonlinear suspension of the support member 18 with higher stiffness at higher oscillations. The tuning of the system dynamics of the harvester 10 is important to efficiency. Variation in the flow rate is one of the factors that impacts energy harvester 10 tuning. FIG. 7 illustrates a plot of experimental results of power outputs over a range of flows of a system of the present invention using low high and variable stiffness according to the present invention. As can be seen in the figures the variable stiffness design can result in a higher yield over the expected flow ranges, as in this example it meets or exceeds the low K system yields at all reasonable flows and will exceed the high K values at flow rates below a kick in threshold. Maintaining tuning of the energy harvester 10 over a broad range of flow rates may be easier if the oscillation frequency would increase as the flow rate increases and this can be achieved to some degree if the suspension is stiffer at higher displacements as shown in FIGS. 4A and B.

It should be apparent that other alternatives are possible within the spirit and scope of the present invention. The present invention is defined by the appended claims and equivalents thereto.

What is claimed is:

1. A fluid flow induced oscillating energy harvester comprising:
    a stand supporting the energy harvester and configured to support the energy harvester in a fluid flow;
    a support member mounted for movement relative to the stand in a direction perpendicular to the direction of fluid flow;
    a bluff body configured to be positioned substantially perpendicular to the direction of fluid flow and pivotally mounted to the support member, wherein sufficient fluid flow causes an oscillating movement of the bluff body and the support member relative to the stand, and wherein the bluff body is pivotally mounted to the support member at a position off-center from the center of mass of the bluff body;
    an electrical generator coupled to the support member, wherein the electrical generator is configured to convert oscillating movement of the bluff body and the support member to electrical power; and
    a support member spring supporting the support member for oscillation about a support member rest position, and wherein the support member spring exhibits a higher stiffness at higher oscillation amplitudes of the bluff body and the support member.

2. The fluid flow induced oscillating energy harvester according to claim 1 wherein the bluff body is pivotally mounted to the support member at a position down-stream from the center of mass of the bluff body relative to the direction of fluid flow.

3. The fluid flow induced oscillating energy harvester according to claim 2 wherein the bluff body is pivotally mounted to the support member for rotation through about a 40 degree range of motion.

4. The fluid flow induced oscillating energy harvester according to claim 3 further including a torsional spring mounted between the support member and the bluff body and configured to bias the bluff body to a neutral bluff body rest position.

5. The fluid flow induced oscillating energy harvester according to claim 4 wherein the bluff body is pivotally mounted to the support member for rotation through about a +/−20 degree range of motion relative to the bluff body rest position.

6. The fluid flow induced oscillating energy harvester according to claim 5 wherein the support member spring exhibits no force on the support member for a range of motion about the support member rest position.

7. The fluid flow induced oscillating energy harvester according to claim 1 wherein the support member spring exhibits no force on the support member for a range of motion about the support member rest position.

8. A fluid flow induced oscillating energy harvester comprising:
    a stand supporting the energy harvester and configured to support the energy harvester in a fluid flow;
    a support member mounted for movement relative to the stand in a direction perpendicular to the direction of fluid flow;
    a bluff body configured to be positioned substantially perpendicular to the direction of fluid flow, wherein sufficient fluid flow causes an oscillating movement of the bluff body and the support member relative to the stand;
    an electrical generator coupled to the stand and coupled to the support member, wherein the electrical generator is configured to convert oscillating movement of the bluff body and the support member to electrical power; and
    a support member spring supporting the support member for oscillation about a support member rest position, wherein the support member spring exhibits a higher stiffness at higher oscillation amplitudes of the bluff body and the support member.

9. The fluid flow induced oscillating energy harvester according to claim 8 wherein the support member spring exhibits no force on the support member for a range of motion about the support member rest position.

10. The fluid flow induced oscillating energy harvester according to claim 8 wherein the bluff body is pivotally mounted to the support member.

11. The fluid flow induced oscillating energy harvester according to claim 10 wherein the bluff body is pivotally mounted to the support member at a position off-center from the center of mass of the bluff body.

12. The fluid flow induced oscillating energy harvester according to claim 10 wherein the bluff body pivotally mounted to the support member at a position down-stream from the center of mass of the bluff body relative to the direction of fluid flow.

13. The fluid flow induced oscillating energy harvester according to claim 12 wherein the bluff body is pivotally mounted to the support member for rotation through about a 40 degree range of motion.

14. The fluid flow induced oscillating energy harvester according to claim 13 further including a torsional spring mounted between the support member and the bluff body and configured to bias the bluff body to a neutral bluff body rest position.

15. The fluid flow induced oscillating energy harvester according to claim 14 wherein the bluff body is pivotally mounted to the support member for rotation through about a +/−20 degree range of motion relative to the bluff body rest position.

16. The fluid flow induced oscillating energy harvester according to claim 15 wherein the support member spring exhibits no force on the support member for a range of motion about the support member rest position.

* * * * *